United States Patent [19]
Thompson

[11] Patent Number: 5,673,106
[45] Date of Patent: Sep. 30, 1997

[54] PRINTING SYSTEM WITH SELF-MONITORING AND ADJUSTMENT

[75] Inventor: E. Earle Thompson, Dallas, Tex.

[73] Assignees: Texas Instruments Incorporated, Dallas, Tex.; AGFA-Gevaert N.V., Mortsel-Belgie, Belgium

[21] Appl. No.: 261,614

[22] Filed: Jun. 17, 1994

[51] Int. Cl.$^6$ .......................... G03G 15/00; G03G 21/00
[52] U.S. Cl. ............................................ 355/208; 355/246
[58] Field of Search ................................. 355/206, 208, 355/246

[56] References Cited

U.S. PATENT DOCUMENTS

| | | | |
|---|---|---|---|
| 3,788,739 | 1/1974 | Coriale | 355/246 X |
| 4,974,020 | 11/1990 | Takamatsu et al. | 355/208 |
| 5,095,331 | 3/1992 | Takano | 355/246 X |
| 5,166,730 | 11/1992 | Urabe | 355/208 |

*Primary Examiner*—Fred L. Braun
*Attorney, Agent, or Firm*—Julie L. Reed; James C. Kesterson; Richard L. Donaldson

[57] ABSTRACT

An intelligent printing system (110). The overall system has a light-imaging subsystem (120), an electrophotography subsystem (130) and a printing substrate subsystem (140). The system processor (126) monitors all of the characteristics of the system, including toner content and quantity, photoreceptor wear and usage, heat of the fuser, quantity of printing substrates remaining, power of the light source, and profile of a spatial light modulator. The monitored processes are used to adjust the printing process so that the maximum print quality is achieved. Additionally, the information received assists in maintaining the highest level of quality functioning of the system through the maintenance cycle.

3 Claims, 4 Drawing Sheets

PRINTING SYSTEM WITH SELF-MONITORING AND ADJUSTMENT

BACKGROUND OF THE INVENTION

1. Technical Field of the Invention

The present invention relates to systems that require the periodic removal or replacement of consumable elements, usually through a process of user intervention. A common example exists in printer engines and in particular, electrophotograpic systems in which all of the consumable supplies and critical reproduction elements must be periodically replaced to ensure print quality and performance. This invention relates to a system and operational method which provides for dynamic monitoring and adjustment of all relevant characteristics of the system affected by use and wear to obtain maximum performance without user intervention for the life of the consumable package. The system further provides data for maintenance, refurbishment and ultimate disposal of the consumable package.

2. Background of the Invention

The requirement for hardcopy output is a ubiquitous element of the information revolution. In particular, electrophotography has become one of the most widely used systems and the dry toner process, has become the most popular for creating copies and prints of documents in a host of environments. The basics of electrophotography are well known to those skilled in the art. The fundamental elements of a electrophotographic printer or copier using the dry toner process include a photo sensitive medium, typically an organic photoreceptor (OPC), which is charged electrostatically to a predetermined voltage and polarity. Upon exposure to an optical image, generated by reflection or a light modulating system, portions of the originally uniform electrostatic charge on the OPC are erased where illuminated. Thus an electrostatic latent image of the original (or the electronic) document is created on the OPC. In most modern systems, this image is passed by a source of developer materials which consists of electrostatically charged toner particles held to ferromagnetic carrier beads. The carriers are used to facilitate the transport of the materials into contact with the above mentioned latent image through the action of magnetic fields and rotating magnets within sleeved cylinders, typically called developer rollers. Through a designed interplay of electrostatic charges, the toner particles that are typically in the 10 micron diameter range, are separated from the carrier beads, typically 50 micron diameter particles, and retained in-place on the appropriate portions of the latent image resident on the OPC surface. The magnetic forces associated with the developer rollers carry the depleted ferromagnetic carrier beads back to the position where they are re-mixed with additional toner for development of subsequent images.

As is well known, the toner materials are normally plastics with flow promoting agents, charge control agents, and color pigments which melt at a predetermined temperature. The OPC surface then carries a developed latent image after exiting the proximity of the developing roller. Subsequently, the photoreceptor surface carrying the developed image is brought into contact with an image receptor, which in most common applications of electrophotography is a sheet of paper, but may be an intermediate material suitable for the build-up of multiple pigmented images as required for color printing. Electrostatic charging systems are typically used to transfer the toner from the OPC to the image receptor.

Whether the final image bearing member is ultimately paper or an other material, it can be successively operated on by multiple photoreceptors, a single photoreceptor, or an image bearing intermediate member to build up the full color image. It exits the printing process through a station referred to as the fuser, where the appropriate heat and/or pressure is applied to the image receptor and thereby fixes the image permanently.

In recent years, color electrophotographic systems have been developed, which in most respects repeat the conventional monochrome electrophotographic printing process multiple times to achieve a color image. In a manner analogous to standard color printer processes using conventional printing arts, the images are reduced to color separations either optically or electronically, and each of the separations is in turn rendered as a printed image. During the printing process, whether offset press or color electrophotographic printer, the appropriate color images are overlaid to produce a finished image. The color inks used in printing are so-called subtractive primaries, magenta, cyan, yellow, and typically black, as opposed to the red, green, blue colors experienced in the world of emissive soft display systems, such as CRTs. The latter are termed additive systems where the combination of all colors produces white, as opposed to the case of printing where the combination of the three subtractive primaries nominally produces black.

It is known in the art of color electrophotography that the color image may be created by layers built up on the photoreceptor in sequential fashion, that the colors may be built up on an intermediate transfer medium between the OPC and the final image receptor, and finally the image may be built up on the final image receptor one color field at a time, either from a single photoreceptor sequentially contacting the image receptor, or a series of photoreceptors sequentially contacting the image receptor. No matter how it is accomplished, the final electrophotographic image is composed of multiple layers of colored toners consisting of the subtractive primaries and black, which are overlaid in a highly registered manner through every step of the process until the completed image is fused to the image bearing member at the conclusion of the printing process.

Conceptually, color electrophotography is similar to conventional offset printing but there are significant advantages in the creation time and the economics for the color electrophotographic printer. In the commercial printing environment several intermediate steps of color separation and plate making are required, and a short run of several hundred prints is needed for a trained specialist to calibrate, registrate, and color manage the image to production standards. In color electrophotography, a print can be obtained without the intermediate steps in a very short period of time and with very low cost per copy, but there is typically no ability by the user to make precise adjustments and achieve optimal output quality.

While in the prior art of color electrophotography, acceptable color images could be obtained by the design of extremely precise and relatively expensive printer systems, a natural aging of the mechanical components maintaining registration and other print factors, combined with the wear and degradation of the consumable components such as the OPC, toner, and developer, have led to a critical maintenance issue in prior art full color electrophotographic systems. The complexity, and the high cost of maintenance of these machines has been one of the principle factors in keeping cost of such systems very high with the respect of the cost of monochrome printers, and made them less attractive than the inconvenient, but undeniably high quality, conventional offset printing and photographic methods of reproducing color images.

The notable success of the desk top monochrome laser printers introduced in the early '80's can be ascribed to a number of factors. One of the most significant is the development of a user replaceable cartridge for the consumable elements, typically comprising the OPC, toner, and developer assembly. Since most of these systems use monocomponent toners, the inclusion of ferrite carriers in the additional complexity of properly managing the replenishment of the developer mix are not an issue for the typical desk top machines. The significant feature of the cartridge is that with a limited lifetime, typically a few thousand pages, a relatively inexpensive and not incredibly precise disposable cartridge could be deployed in a format that is readily interchangeable by the unskilled user/operator.

The effect is that the consumable or wear prone, components of the otherwise esoteric electrophotographic printing process are periodically replaced, in effect rendering a like-new print engine with every cartridge replacement. In this manner print quality for the monochrome systems has achieved new standards of convenience and constancy. By so doing, one of the most disturbing facets of office life of the '80's, the necessity to replace consumable components in the copier, has been reduced from a messy and difficult task to a simple straight forward, efficient interchange. The down time, necessity for service calls, associated service and periodic maintenance cost, and inconvenience to the user have been drastically modified by this approach. A further advantage lies in the fact that the replaceable cartridge contains an engineered system of matched components of known origin, consistency, and performance expectations. The user could comfortably rely on the fact that simply replacing the cartridge would restore everything to as purchased performance and quality. Likewise, the disposal of the used products became similarly convenient because of the encapsulated nature of the design and enclosure of the sum of the consumable elements.

Compared to the conventional office copier with skilled service requirements, and bottle type toner addition, the cost per copy of the convenience provided by the disposable cartridge packaging has increased slightly. The benefit of the convenience factor and the quality and performance factors and the reduction of preventative maintenance provided by service contract have more than offset the small cost per copy increment. The total cost of operation of these systems has been competitive, and the user replaceable cartridge concept has been embraced by the industry.

The desirability of extending the benefits of the user replaceable cartridge of consumable and wear prone components to the color EP arena is obvious. Significant barriers to doing so exist, however. The monochrome desk top laser printers represent vastly simplified version of the EP process compared to color systems. The former usually incorporates a simpler developer system using monocomponent toner (MCT) with no carrier beads, while color systems require the added complexity of dual component toners (DCT) to obtain color quality and image performance. The black and white printers usually operate to produce only binary dots (black or white), basically driving the OPC discharge well into saturation. Color systems generally require gray scale latitude at each pixel to achieve good tonal range and color gamut, hence, a far more difficult process control requirement. Another major difference is the need to accurately register the successive color images onto the finished page, an aspect unnecessary in monochrome images. The respective color toner supply systems must be kept segregated to avoid color contamination. Color management software must be incorporated to correctly manage the interplay of these and other parameters to achieve accurate color rendition and constancy from print-to-print.

Just as the necessity of four successive color image implementations to achieve color output adds complexity to the process, it inevitably adds size, weight, and bulk. The concept of a single user removable cartridge with all the essential color image forming hardware and consumable almost becomes unwieldy. There exists a need for a method to allow segmentation of the various operations and their respective elements, while maintaining quality control, compatibility, and the ability to adopt the overall imaging process to the particular species, or condition of all of the individual elements taken as a group.

It is evident that there exists a need for a system concept to control and manage the individual elements of the EP process, regardless of their partitioning, to achieve good color print performance and economics across a range of conditions and variables. From the point of manufacture to the point of final disposal, substantially more tracking and parametric data management needs to be incorporated than exists in current monochrome or color printer systems. This applies to a broad range of technologies and media, from electrophotography (both dry and liquid toner), through ink-jet, dye and wax transfer systems, film-based systems and thermal media.

SUMMARY OF THE INVENTION

It is possible to build a printing system within a printing process that monitors all of the relevant characteristics of the system to allow for dynamic adjustment for highest quality. The monitoring tracks all aspects of the system that are affected by use and wear factors, allowing the system to adjust to the new characteristics each time it prints. Additionally, the process makes the adjustments transparent to the user, merely notifying the user when the system needs servicing, and allows tracking of the system maintenance during the refurbishment process.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
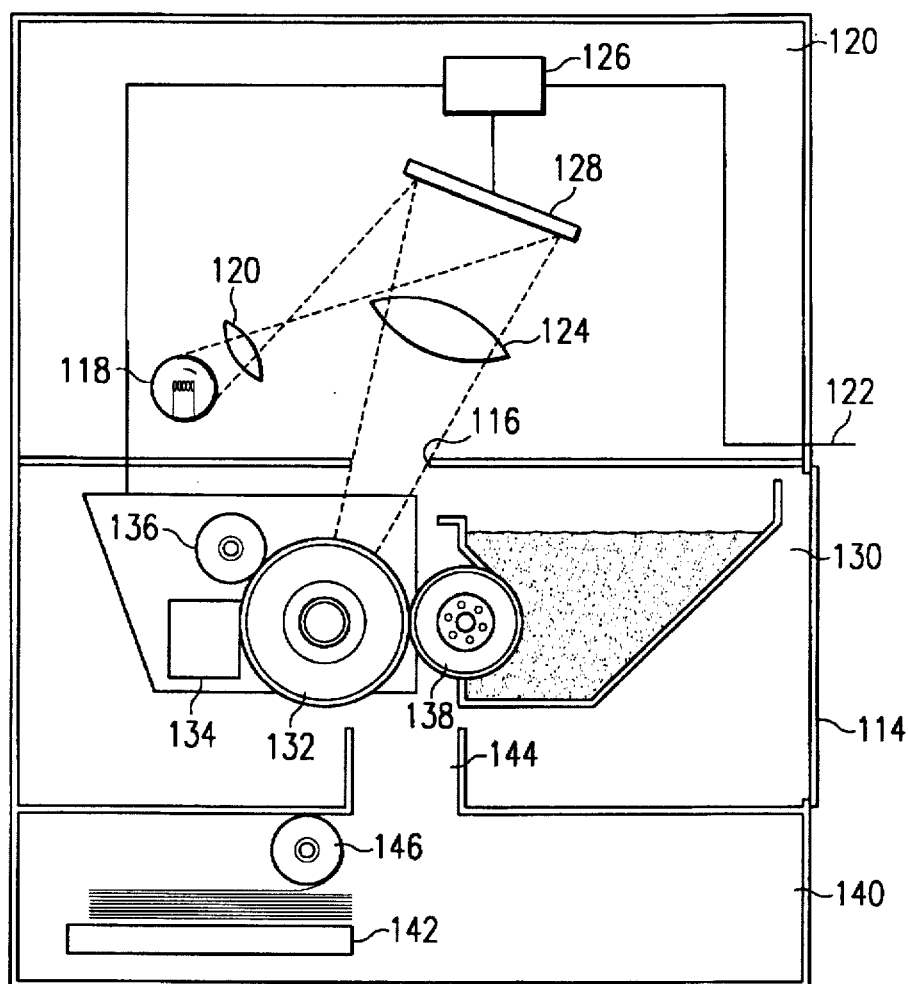
FIG. 1 shows a side view of an intelligent printing system.

FIG. 1 shows a block diagram of a printing system 110. The housing 112 in this embodiment comprises molded plastic, unitary except for an access panel 114. This type of housing is disclosed in U.S. Pat. No. 5,172,161, "Unibody Printing System and Process." The plastic is molded with arms, shelves or slots, allowing the individual subsystems 120, 130, 140, and/or individual components within the subsystems to be inserted into place already aligned and properly seated.

The subsystem 120 is the light-imaging subsystem. It contains at least the light source 118, a modulator 128, electronic control circuitry 126, power supply, network interfaces, if used, and access to the basic paper path hereinafter referred to as an interface or port, 116. Port 122 allows the electronic control circuitry, referred to here as the system processor, to interface with the computer system to receive image data and process it into commands for the light-imaging subsystem. The light source could be one of many options. Some examples could be an arc lamp such as a tungsten source, light-emitting diode (LED) or a laser. The modulator could be the polygon scanning mirror that is currently used in laser printers, or a spatial light modulator, such as the digital micromirror device (DMD). An example of a light-imaging system using a spatial light modulator can be found in U.S. Pat. No. 5,072,239, "Spatial Light Modulator Exposure Unit and Method of Operation."

The light-imaging subsystem 120 forms the print information into an image to be eventually formed onto paper. The spatial light modulators used is such systems typically consist, of arrays of individually addressable elements, which form the image. The image is passed through port 116 to the electrophotography (EP) subsystem 130. The unused portion of the light will "remain" or be absorbed in the light-imaging subsystem housing to maintain print clarity. An additional utilization of this light in conjunction with a photocell as a way to monitor the spatial light modulator will be discussed in detail later. One such method for managing the unused light is shown in U.S. Pat. No. 5,101,236, "Light Energy Control System and Method of Operation."

Another communications port exists besides the transfer port 118. Electronic communications is maintained through port 122, between the light-imaging system 120 and EP subsystem 130. EP subsystem 130 contains at least one photoreceptive surface, such as an organic photoreceptor (OPC) currently in use in many printing systems. It also contains the needed toner reservoir or reservoirs, and a processor or control circuitry that allows the EP subsystem to act as an intelligent or "smart" cartridge.

At a minimum the EP subsystem will contain an OPC 132, a charging means 136, an interface 116 between the OPC and the light-imaging subsystem, a toner transfer means 138, an interface or port, 144, between the OPC and the printing substrate, and a way to clean the OPC 134. Here the system is shown with an OPC 132 which receives charge from a charge roller 136. The charged surface of the OPC passes under the interface between the light-imaging subsystem 120 and receives a latent image, where the charge on the OPC alters when impinged by light. The latent image then attracts toner, which in this example is passed by a magnetic roller 138. The image having been formed on the OPC by the toner is transferred to the printing substrate at the second port 144. After the toner is passed onto the printing substrate, it is cleaned off of the OPC usually by some type of blade 134, and the used toner goes into a reservoir.

Not shown is a fuser, which fuses the toner image onto the paper, preventing smearing. This is typically done by means of a heated roller system, with the heat sealing the toner (typically some type of plastic) particles by melting them into the paper.

Subsystem 140 is the printing substrate subsystem. Printing substrates are those surface upon which the final image is transferred by toner from the photoreceptor. Common examples are paper, photographic paper for the printing of photographic images, and transparencies. A belt may be used for multiple transfers within the system, or as shown here, a pickup roller 146 may be used. One possible way to interface between the substrate subsystem and the EP subsystem is to have an opening or port such as port 144 where the substrate passes by the photoreceptor which transfers the toner to the substrate. The loading and transporting of the substrate is handled in the substrate subsystem. Fusing can be either in the EP subsystem or the substrate subsystem. Note that while these three subsystems are shown in separate blocks, that is merely to facilitate understanding of the functions of the systems, not to imply that any or all of the components cannot be integrated into one system.

The entire operation, from the commands activating the light-imaging subsystem to the substrate leaving the printer, has inherent non-linear characteristics. The discharge curve and light sensitivity characteristics of most photoreceptors are non-linear, as is the properties of most toner compositions. For high quality printing each and every component must be monitored and its status updated continuously to allow for maximum performance.

Figure 2:
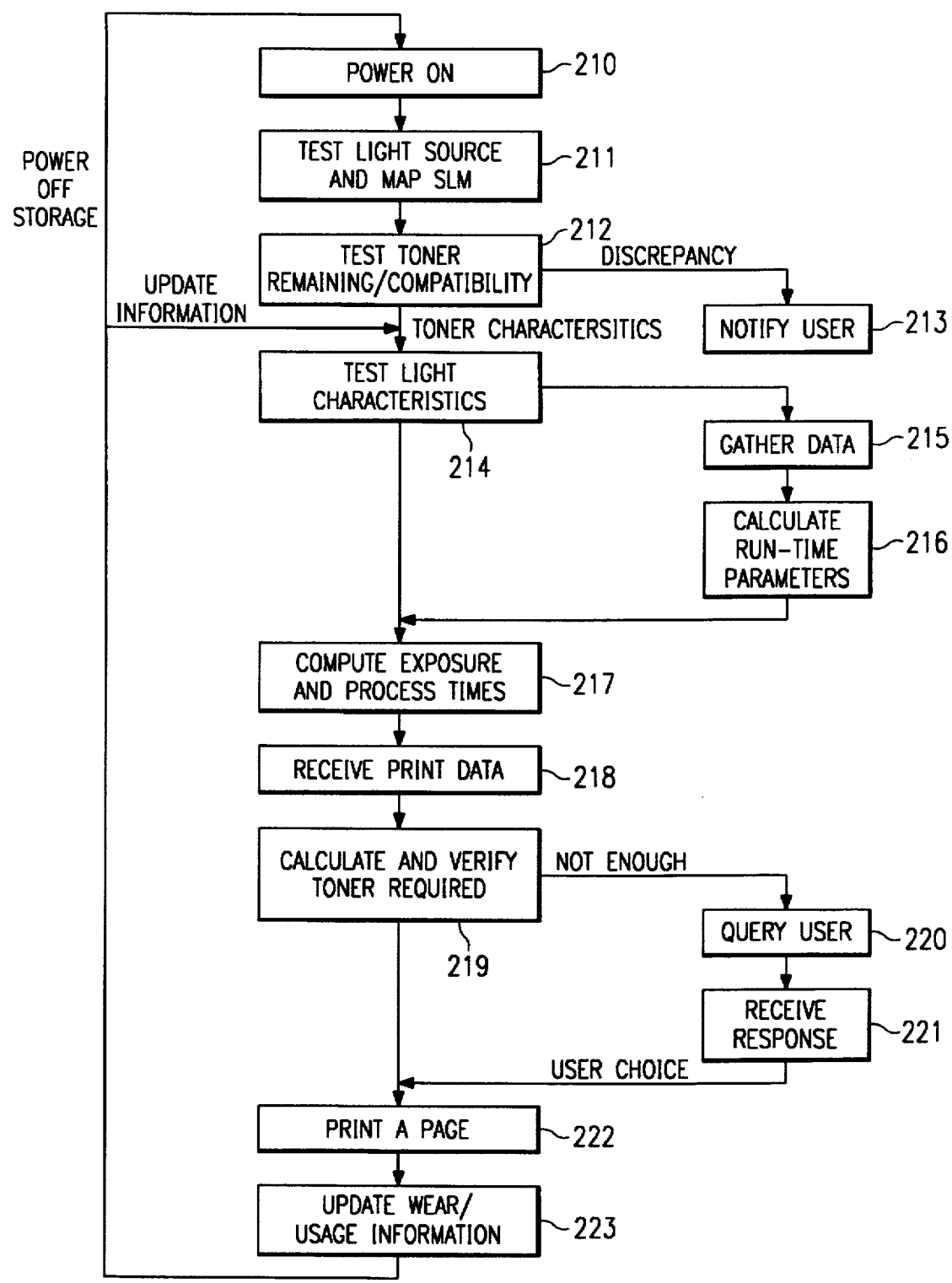
FIG. 2 shows a flow chart of the monitoring process.

One process to achieve these goals is shown in the flow chart of FIG. 2. The process begins when the printer is powered on in step 210, but as will be discussed further, the process can restart at any point the designer desires. After the printer is on, the system tests the light source in step 211. One possible way to do this is to use a photocell or photocell array, as previously mentioned. The light source illuminates a spatial light modulator array, for example, on which all elements are OFF. The photocell receives light from all of the elements, measures the intensity and records which, if any, elements of the modulator are not functioning correctly, by identifying discrepancies between what should be received and what was received (received light when they are all supposed to be OFF, or dark). The EP subsystem could then generate a map of the defective elements, or the main system processor.

The advantage of using a spatial light modulator consisting of rows of individually addressable elements is that correction can be made for these defective pixels. The array is merely extended some predetermined number of rows in the process direction, by adding rows of elements. When a pixel is defective in a row, an operative pixel at the same column position in one of these extended rows can receive the data intended for the defective pixel and transfer the appropriate amount of light to the OPC.

In step 212, the system measures the amount of toner remaining at power up and also calculates how much should be remaining. The calculation is based upon the number of pixels formed at whichever gray levels were used. If there is a discrepancy between the actual measured amount, and the calculated amount, i.e. how much there is versus how much there should be, the system notifies the user in step 213. If there are no discrepancies, the process moves to step 214.

The EP subsystem receives the data from the light and the power up toner tests. Various sensors from components in the system transmit information to the EP subsystem processor, via electrical connection to between the various components and the inputs of the processor. Some components may be active, with their own monitoring capabilities, others might be passive, for which the parameters must be calculated or sensed by the main processor. Examples of some of the parameters taken into effect are humidity, toner density, OPC diameter (some of it gets worn away from cleaning), fuser temperature, light output and power fluctuations. In step 217, the EP processor or the main system processor, but most likely the system processor, then calculates the exposure times necessary at different levels of intensity depending upon those characteristics. The EP subsystem communicates the information from the monitored processes to the system processor before the system processor receives the print data in step 218.

Next the system processor calculates the toner necessary to form the printed images desired and verifies that it has enough, in step 219. If it does not, it notifies the user, as in step 220. The user response in step 221 will dictate how the system must adjust the image to conserve toner, possibly by eliminating gray levels, or allowing the user only those levels for which it has enough toner. Additionally, it could limit the use of a given color. One additional function that may occur is monitoring of the substrate supply and notification of the user if it has been depleted.

The page is actually printed in step 222 and the EP subsystem updates its information in step 223. Such updates might include the number of revolutions of the OPC, or the amount of toner used. The process then repeats itself at one of many different places. Some of the parameters, such as the amount of toner remaining, need to be stored for use in the power up tests. These would be stored in some form of non-volatile memory. Other parameters may only be needed for the running time of that session.

Depending upon the application of the system, it may be desirable to test the light source after each page, for example. The process could also repeat itself between various steps. Another possibility is to have it return to a different point depending upon how many times the process has run. For example, for the first ten pages it may return to step 214, and then return once to step 212. Every fifth time it returns to step 211. The entire process as shown in the flow chart is done by the EP subsystem and the system processor.

Figure 3:
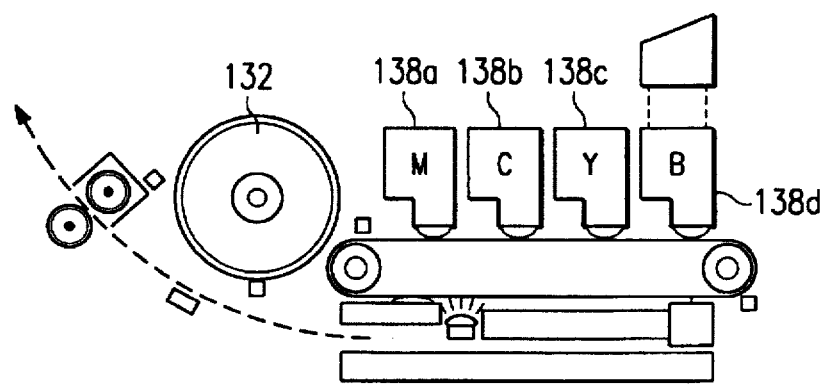
FIG. 3 illustrates a single OPC electrophotography subsystem.

FIG. 3 shows a single OPC 132 color EP subsystem, similar to the EP subsystem shown in FIG. 1. Instead of one toner reservoir, it has four 138a–138d, for the three subtractive primary colors (magenta, cyan and yellow) and black. The image is created by successive passes of the substrate, once for each color. The quality of the toners used and the registration of the substrate become additional parameters to be monitored by the system.

Depending upon the toner used, it may be desirable to vibrate the toner to generate triboelectric charges as may be required for the electrophotographic process to achieve uniform transfer onto the photoreceptor. However, one method of vibration may achieve both the necessary agitation and a way to measure the amount of toner remaining. Activation of a voice coil would provide the necessary vibration to keep the toner charges generating. The back-EMF of the coil could then be measured to determine the amount of toner remaining.

Additionally, vibration may be necessary to prevent clumping or for toner mixing. This vibration would have to be damped out so as not to cause blurring in the transfer. An additional mechanical compensation will have to occur if the photoreceptor spins or is transported by a belt. The number of spins or completed circuits will contribute to calculating the wear on the photoreceptor, and may require some mechanical adjustment. The photoreceptor then transfers the toner onto the printing substrate, shown by the directional arrow. Regulation of all of these steps, and the light from the other subsystem is desired for optimal function of the system.

Regardless of which configuration is used, whether the one shown in FIG. 1, or the one shown in FIG. 3, the toner dispenser must have certain minimum features. As described above with respect to FIG. 1, some type of transfer mechanism must be in place to transfer the toner from the dispenser reservoir to the photoreceptor with the latent image. Currently, the most conventional way to accomplish this is via a magnetic brush, as previously discussed. Secondly, the toner dispenser must include some type of monitoring capability to notify the EP or system processor of the amount of toner available. The monitoring could be done with a weight or level sensor, as indicated in the discussion of FIG. 1, or a voice-coil as discussed above. The choice of monitoring depends upon the nature of the toner used, and therefore is a design choice left up to the system designer.

For example, as discussed above, some types of toner may require mixing or vibration to generate tribo-electric charges. In this situation, the designer may opt for a combination mixing/monitoring capability, such as the voice coil discussed above.

Regarding light, monitoring, the two-way port 122 (from FIG. 1) allows the light-imaging subsystem and the EP subsystem to communicate. The light-imaging subsystem knows how much light has been transferred to the EP subsystem. The EP subsystem can monitor how much light is received, and be programmed to warn of any discrepancies between the two, indicating a misalignment or failing subsystem. Additionally, the EP subsystem can direct the light-imaging subsystem to adjust electronically for changing characteristics in other components, such as wear on the photoreceptor. Due to abrasion, the photoreceptor eventually loses some of its diameter, resulting in a slightly shifted image. The EP subsystem can direct the light-imaging subsystem to electronically adjust the image to its original spot.

One method of monitoring the light-imaging subsystem is to place a photocell or an array of photocells, or a charge-coupled device (CCD) array in the unused light pathway. The photocell could also monitor the unused light and monitor the status of the spatial light modulator in real time. This information would allow the system to correct for stuck elements, thereby providing a higher quality print image.

If the system uses an array of light-emitting diodes (LEDs), the photocell could be used to monitor the shades of gray. Using an LED array allows the system to have additional resolution than that obtained by the spatial light modulator by modulating the power of the LED (full, ½, ¼, etc.). As each LED is turned on, a different shade of gray can be achieved by the system. The photocell can monitor the intensity of each level connected with various combinations of on LEDs. The subsystem would receive the amount of time necessary for each level, and take those times into account when adjusting exposures. Additionally, as previously mentioned, the system could monitor the spatial light modulator for stuck or non-responsive pixels and adjust accordingly.

In addition to the time for gray levels, the EP subsystem also will monitor the toner characteristics, the photoreceptor characteristics and wear, and the toner usage. The light information received that allows the EP subsystem to adjust the exposure times for achieving gray levels is especially important when dealing with color systems.

Figure 4:
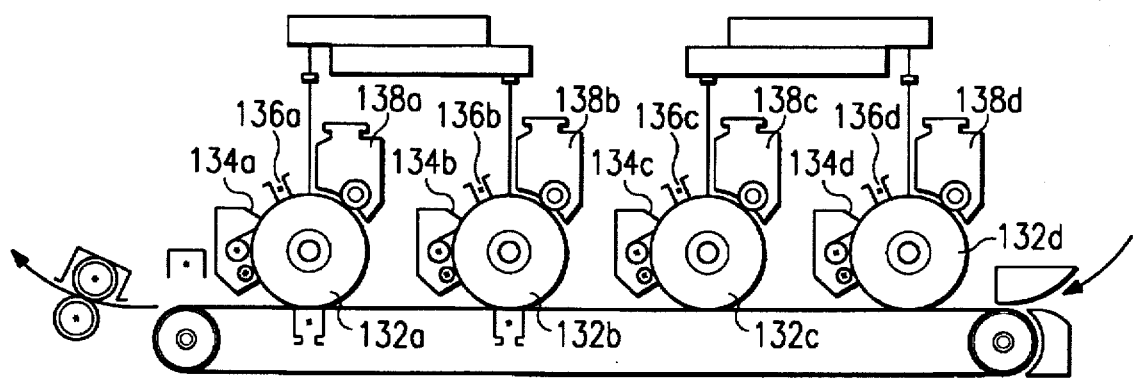
FIG. 4 illustrates a multiple OPC electrophotography subsystem.

A different monitoring and compensating requirement occurs in the four-OPC EP subsystem in FIG. 4. In this embodiment, each roller is a photoreceptor 132a–132d with its own toner dispenser 138a–138d, corona 136a–136d and cleaning blade 134a–134d. The EP subsystem must monitor each of these separate stations and maintain print quality throughout.

In order to adjust the operation of the system, the EP subsystem must be pre-loaded with software that has the capabilities and limitations of the particular photoreceptor, the toner and the devices used in the light-imaging system. The printing system could dynamically adjust to several factors in its operation. The printer could have stepper or servo controllers for controlling OPC rotation speed, and controllers for the electrostatic generation (coronas) and the fuser temperature, as examples. These parameters could then be changed easily, allowing the entire system to be upgraded merely by replacing the EP cartridge. Additionally, the amounts of the toners and the history of each component must be loaded via the software in the EP subsystem. This software allows the user to get toner replaced and their subsystem fixed for any problems or anomalies without any effort on their part.

The software runs during operation and writes the current parameters into non-volatile memory as they change. A diagnostics function sends warnings or messages to the user for replacement of toner, components or repair. The non-volatile memory requires some sort of battery backup to keep the information when the printer is off. The non-volatile memory offers additional advantages.

Figure 5:
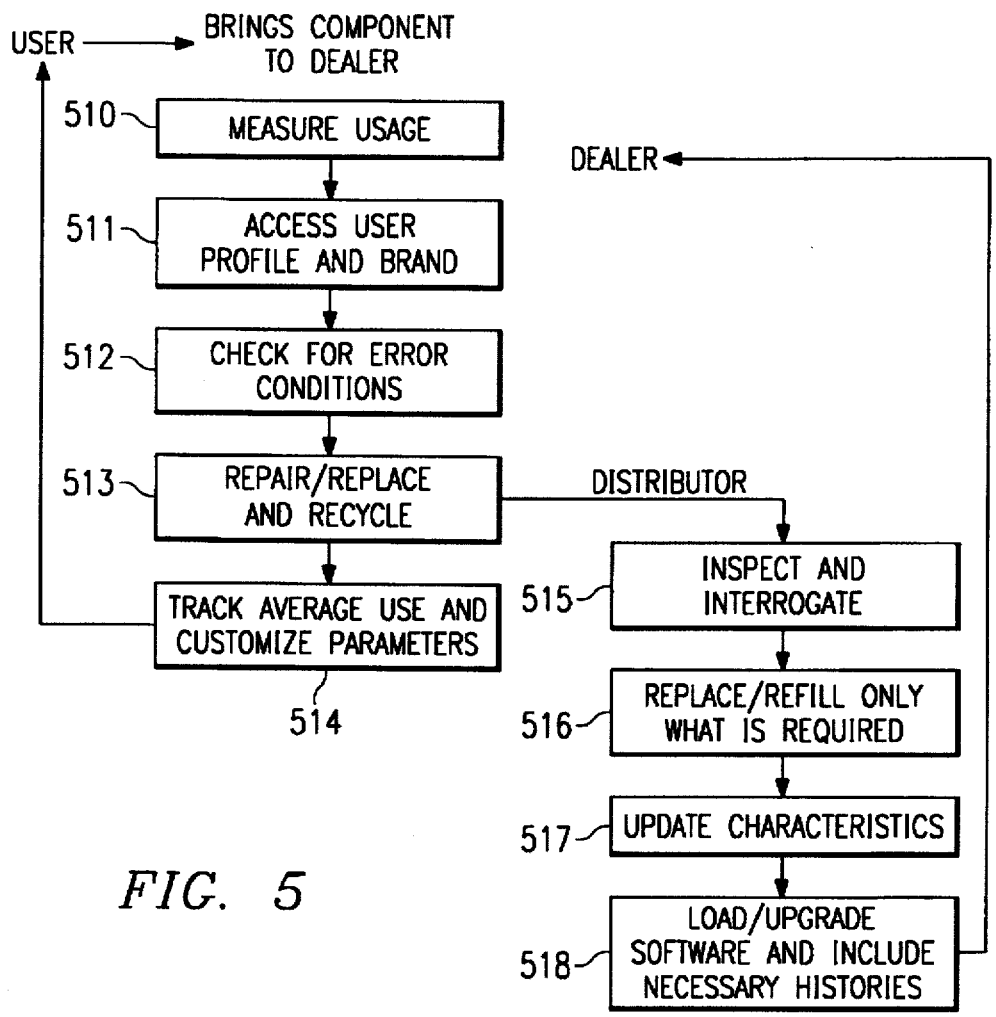
FIG. 5 shows a flow chart of the maintenance process.

The main advantage is that when the printer does inform the user that it needs more toner, for example, the user takes it to a distribution center, where monitoring units are interfaced with the non-volatile memory. The distributer can then see what needs to be replaced or where the problem lies and either send it on to the repair center, or possibly even refill it there. Meanwhile, the user is given a new or refurbished printer as a replacement, each with its own software unique to it. In order to avoid any confusion or possibility of error, the software and the operating parameters are erased as soon as the EP subsystem is opened. This avoids any possible retention of old system parameters and subsequently possible lower quality printing. The system can then be refurbished, reprogrammed and redistributed. The method for refurbishing is shown in FIG. 5.

The maintenance process begins when the user, possibly after being notified by the printer, takes the printer, or some component to the dealer. The dealer then measures the usage of the system in step 510. This information is used to update the user profile in step 511. Additionally, in step 511 the dealer receives information about the brand name of the component or the system that it came from for higher compatibility of replacement parts. In step 512 the dealer checks for any error conditions in the software of the printer.

The error conditions then dictate the dealers actions. In step 513, if the dealer has the capability, he or she then repairs or replaces the component that caused the error. Any parts that are replaced that are not repairable are then recycled if possible. If the dealer is not capable of remedying the error, the user is given a replacement and the damaged part is sent to the distributor. In step 514, assuming the dealer could remedy the situation, the system is recalibrated with the average use and the operating parameters are updated to match the new information. At that point, the component or system is returned to the user.

If the dealer is unable to handle the problem in step 513, he or she sends it to the distributor for depot-level repair in step 515. The distributor interrogates the system and inspects it to determine the problem and identify the best solution. The distributor will replace or repair only the minimum necessary in step 516. This keeps the system compatibility as high as possible. In step 517, the characteristics of the system are updated. Finally, the software resident in the system is updated and loaded to show the new components. Additionally, at this stage any necessary histories are also loaded. As mentioned previously, some components are active components capable of monitoring and storing their own histories. The passive components' histories will have to be input into the system so the system can monitor the use and operating characteristics of those components.

Figure 6:
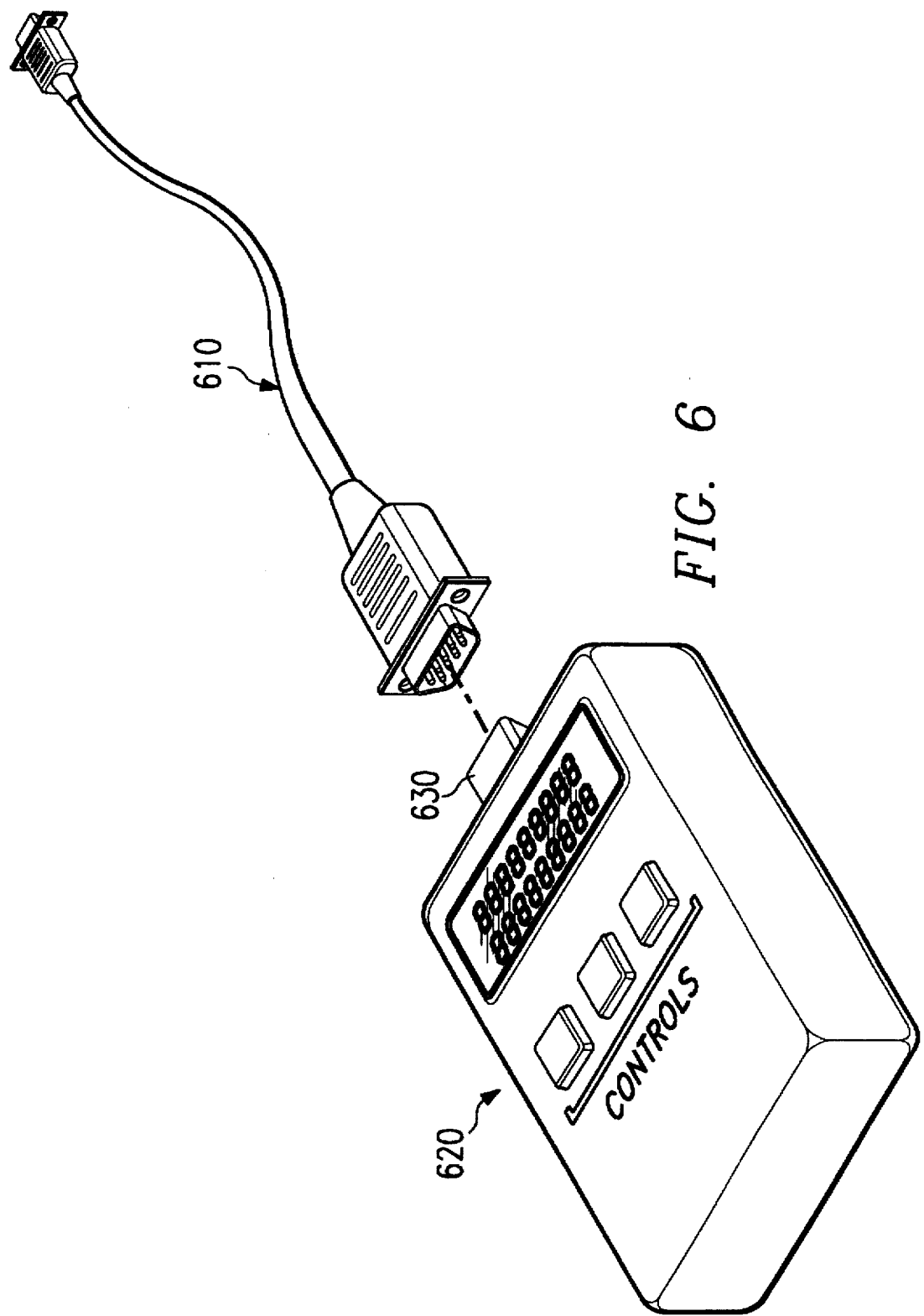
FIG. 6 shows a hand-held unit that allows communication with an intelligent printing system.

Communication between the EP subsystem and the system processor and the distributor can be achieved in many ways. A particularly convenient way would be by way of a hand-held unit. This unit could be connected to the printer system by means of a cable connector 610 shown in FIG. 6. The hand-held unit 620 could also have the means to communicate without wires, such as by optical or other means. A transponder could be inserted or attached to the EP subsystem and used to communicate between the subsystem and the distributor. The old information from the EP subsystem's previous system or components would be deleted and its new subsystem's or component's parameters entered. For tracking information or environmental controls, some resident information may be desired.

One additional advantage of the non-volatile memory is the capability to track any EP subsystems that are improperly discarded. Toner typically has chemical properties that may be highly toxic and/or environmentally harmful. Improper disposal of these can result in harm to the environment. The non-volatile memory or transponder can store a header that identifies the manufacturer and/or the distributor of these subsystem and therefore prevent future damage to the environment, as well as provide the names of a responsible party for clean up.

The above system allows for high-quality printing with components that are used to the actual, as opposed to calculated, end of their usefulness. The extended use, and ease of refurbishing, allows cheaper, high quality printing with minimum effort on the part of the users.

Thus, although there has been described to this point particular embodiments of a printing system with an intelligent EP subsystem, it is not intended that such specific references be considered as limitations upon the scope of this invention except in-so-far-as set forth in the following claims.

What is claimed is:

1. A printing system comprising:
   a. a light-imaging subsystem;
   b. a EP subsystem including:
      i. at least one photoreceptor operable to receive light from said light-imaging subsystem;
      ii. at least one toner dispenser operable to dispense toner to photoreceptor, wherein said toner dispenser includes monitoring capability and is operable to transfer said toner to said photoreceptor;
      iii. an interface with said light-imaging subsystem through which said light can pass;
      iv. a transfer port for transferring said toner to printing substrates;
   c. a substrate-handling subsystem wherein said at least one photoreceptor transfers toner to a printing substrate through said transfer port; and
   d. a processor for continuously adjusting operation of said system in accordance with data received from said EP subsystem, wherein said adjustment includes controlling numbers and selection of gray levels and colors available to a user and notification of system failures for said user.

2. The system of claim 1 wherein at least one component of said EP subsystem has active monitoring capabilities that are in communication with said processor.

3. The system of claim 1 wherein said processor must calculate the operating parameters of at least one component of said EP subsystem.

* * * * *